(12) United States Patent
Feller

(10) Patent No.: US 7,628,081 B1
(45) Date of Patent: Dec. 8, 2009

(54) ACOUSTIC PULSE FLOW METER

(76) Inventor: Murray F Feller, 21577 NW. 75th Avenue Rd., Micanopy, FL (US) 32677

( * ) Notice: Subject to any disclaimer, the term of this patent is extended or adjusted under 35 U.S.C. 154(b) by 507 days.

(21) Appl. No.: 11/681,858

(22) Filed: Mar. 5, 2007

(51) Int. Cl.
*G01F 1/66* (2006.01)
(52) U.S. Cl. .................... 73/861.27; 73/861.29
(58) Field of Classification Search .. 73/861.27–861.31
See application file for complete search history.

(56) References Cited

U.S. PATENT DOCUMENTS

| | | | |
|---|---|---|---|
| 4,326,417 A * | 4/1982 | Migliori | 73/601 |
| 5,381,698 A | 1/1995 | Wiley | |
| 5,392,657 A | 2/1995 | Feller | |
| 6,227,058 B1 | 5/2001 | Tretiakov | |

* cited by examiner

*Primary Examiner*—Harshad Patel
(74) *Attorney, Agent, or Firm*—David Kiewit

(57) ABSTRACT

A time-of-flight flow meter that is particularly useful for measuring the flow of gases, such as steam, uses a spark gap periodically energized with an electrical pulse to generate an acoustic pulse. The pulse is detected by upstream and downstream acoustic detectors that may be capacitive transducers having flexible plates wetted on both sides by the fluid so that no external venting is required. The acoustic detectors may be electrically heated to avoid condensation effects. In some cases the interior of the pipe or other conduit is shaped near the source so as to define acoustic beams aimed at the detectors and so as to concentrate the received acoustic energy on the detectors.

18 Claims, 4 Drawing Sheets

ACOUSTIC PULSE FLOW METER

BACKGROUND OF THE INVENTION

1. Field of the Invention

The present invention relates to apparatus and methods of acoustic flow measurement using acoustic pulses to derive fluid flow rate.

2. Background Information

The prior art teaches ultrasonic time-of flight flow meters which rely on acoustic waves propagating in the flowing fluid. These devices usually use piezoelectric transducers to convert electrical drive signals to the propagated acoustic energy and to convert the received acoustic energy to electrical signals for processing to derive the fluid flow rate.

Piezoelectric transducers are typically made of ceramic materials such as lead zirconate titanate which, while relatively economical and efficient, have mechanical properties that are significantly different from those of the flowing fluid with which they are interfacing. These differences result in poor acoustic coupling or impedance mismatching between the transducer and fluid, which in turn necessitates the use of higher gain signal amplifiers and more elaborate noise filtering and signal processing which add cost to the meter. The mismatch becomes extreme when ceramic piezoelectric transducers are used to measure flow of gases, such as steam or stack gases. Furthermore, the elevated temperatures sometimes encountered in measuring flow of gases can pose an additional incompatibility.

Therefore, there is a need for cost effective apparatus and methods for minimizing transducer-to-fluid mismatching and for increasing the transducer operating temperature in acoustic time of flight flow meters.

BRIEF SUMMARY OF THE INVENTION

The present invention relates to apparatus and methods for measuring the flow rate of a flowing fluid using acoustic energy transmitted through the flowing fluid. One preferred embodiment of the invention comprises an acoustic source transducer which propagates acoustic energy along the flow axis in two directions. The preferred source transducer is located between two receiving transducers from which upstream and downstream signals are obtained to derive the flow rate of the fluid from the difference in propagation times.

A preferred acoustic source transducer comprises a pair of electrodes spaced apart by a gap through which the fluid flows. These electrodes are periodically energized with an electrical pulse to cause an acoustic emission. In a gas, the electrical pulse voltage would typically be of such magnitude as to cause a dielectric breakdown, after which the energy dissipated by the resulting spark would heat and expand the surrounding fluid to produce the acoustic pulse. This may also happen with liquids having low electrical conductivity. When used with liquids having a relatively high conductivity, the discharge energy is dissipated by conduction through the liquid and may produce rapid local boiling that produces the acoustic pulse. The acoustic energy produced this way is typically much greater than that available from piezoelectric transducers. However, due to pulse generation difficulties, only a single pulse is normally produced, as compared to the extended bursts of pulses characteristic of prior art ultrasonic flow meters using piezoelectric drive transducers.

Preferred acoustic receiving transducers use capacitive transducer principles in their operation but differ from the typical capacitive transducer in that they do not incorporate a high voltage plate. Instead, they provide a capacitance that varies when the acoustic energy is received from the source transducer. The movable plates of the capacitive transducers are very thin and of very low mass in order to provide a far better match to the fluid being sensed than do their piezoelectric counterparts. As in other time-of-flight flow meters, the time difference between upstream and downstream propagation of the acoustic pulse is electronically converted into a measure of flow rate.

The spark source and capacitive receiving transducers may be readily constructed from metals such as stainless steels, titanium and tungsten, and high temperature insulators such as Teflon, polyetheretherketone and porcelain ceramics and are therefore relatively tolerant of high temperature environments. The mechanical simplicity of the transducers results in their being very cost effective.

A preferred time of flight flow meter of the invention for measuring flow of a fluid along a flow direction comprises an acoustic source, two capacitive acoustic detectors and a circuit operable to selectively detect respective changes in electrical capacitance occurring when the acoustic pulse arrives at each of the acoustic detectors; to determine a time of flight difference between the respective changes, and to calculate therefrom the rate of flow of the fluid. The preferred acoustic source comprises two electrodes spaced apart by a gap and is operable to supply an acoustic pulse responsive to a high voltage electrical input pulse. A particular preferred embodiment of the invention comprises two capacitive acoustic detectors spaced apart along the flow direction. Each of them comprises a respective fixed plate and a respective flexible plate interposed between the respective fixed plate and the acoustic source. Each of the fixed plates is exposed to the fluid and faces the acoustic source. Each of the flexible plates is spaced apart from the associated respective fixed plate by means of a respective insulator. Each flexible plate has a respective front surface and a respective rear surface, each rear surface facing the respective fixed plate and each front surface facing the acoustic source. Thus, both of the front and rear surfaces of the each flexible plate and at least the front surface of the fixed plate are exposed to whatever fluid is present.

Piezoelectric receiving transducers are employed in another embodiment of the invention in which a combination of acoustic concentrating structures adjacent the source and receiving transducers, and the high acoustic power of the spark source are adequate to overcome the impedance mismatch between a ceramic element and a flowing gas.

Although it is believed that the foregoing description may be of use to one who is skilled in the art and wishes to learn how to practice the invention, it will be recognized that the foregoing recital is not intended to list all of the features and advantages. Those skilled in the art will appreciate that they may readily use both the underlying ideas and the specific embodiments disclosed in the following Detailed Description as a basis for designing other arrangements to achieve the same purposes of the present invention and that such equivalent constructions are within the spirit and scope of the invention in its broadest form Moreover, it may be note that different embodiments of the invention may provide various combinations of the recited features and advantages of the invention, and that less than all of the recited features and advantages may be provided by some embodiments.

DETAILED DESCRIPTION OF THE PREFERRED EMBODIMENTS

Figure 1:
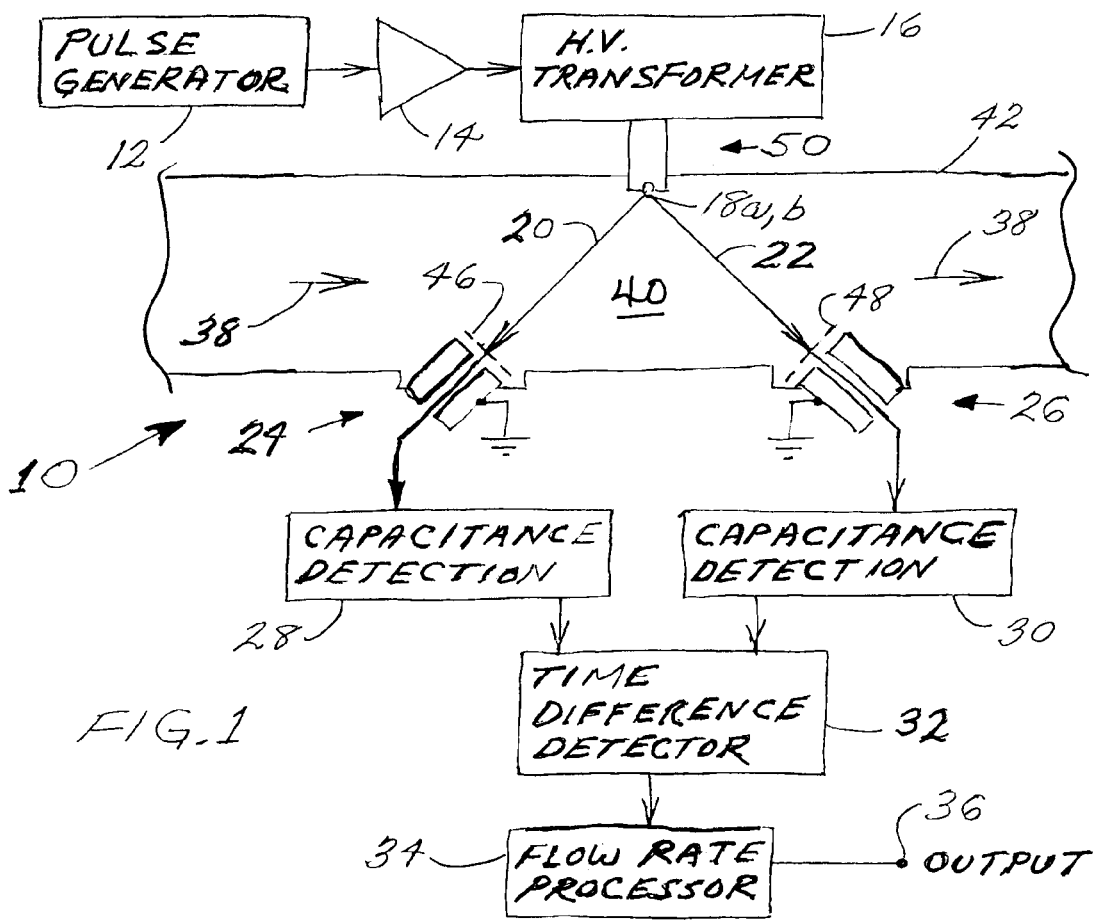
FIG. 1 is a simplified block diagram of the blocks of a preferred flow meter of the present invention.

Turning now to FIG. 1, one finds a simplified block diagram of a preferred flow meter 10, of the present invention. A pulse generator 12 provides pulses to an amplifier 14 which is connected through a high voltage transformer 14 to a mutually insulated electrode pair 18a,b that comprise a portion of the acoustic source or transmitting transducer 50. If the fluid 40 is a gas, each pulse from the pulse generator 12 can produce an electrical discharge between the electrodes 18a,b. The resultant acoustic energy pulse is propagated through the fluid 40, as indicated by arrows 20, 22, to the flexible movable plate 46, 48 portions of the acoustic detectors or receiving transducers 24, 26. Each of the receiving transducers 24, 26 is connected to a respective capacitive detection circuit 28, 30. As is known in time-of-flight flow measurement, there is a difference in the upstream and downstream propagation times responsive to flow of fluid, indicated by the arrow 38, within a pipe or other conduit 42. This difference is detected by a time difference detector 32 and processed by the flow rate processor 34 to provide an output 36 representative of the fluid flow rate.

A preferred pulse generator 12 produces short electrical pulses at one second intervals. These are amplified to provide high differential voltages at the electrode pair 18a,b, which in turn leads to an acoustic pulse. One example of an applicable method for producing these pulses is that commonly employed in automotive capacitive discharge ignition systems. It may be noted that although the present discussion of a preferred embodiment generally refers to the high voltage electrical pulse producing a dielectric breakdown, the invention does not depend on this occurring. Local heating from the electric drive pulse is capable of producing an acoustic pulse even when the fluid in use is a liquid with a fairly high electrical conductivity.

The acoustic pulse is propagated outwards radially from the line extending between the two electrodes. In some embodiments, as may be used to measure relatively slow flow rates, the preferred receiving transducers are equally spaced from the source transducer so that the pulse reaches both of them at the same time when the fluid is stationary. When the fluid is flowing, the acoustic pulse is received by the transducers at different times and the fluid flow rate is derived from that time difference.

The leading edge rise time of the acoustic pulse is used to determine the interval of the differential time and therefore must be of relatively short duration for acceptable measurement accuracy. Dielectric breakdown is generally fast enough so that the propagated acoustic pulse has a short rise time. A preferred embodiment of a source transducer 50 is illustrated in cross section in FIG. 2. In this embodiment the electrodes 18a, 18b have shaped tips 52a, 52b attached to them. The electrodes are mounted in an insulating housing 44. O-rings 54, 56, 58 are preferably supplied to prevent leakage of the flowing fluid from the flow conduit to the ambient region around the pipe.

Figure 3:
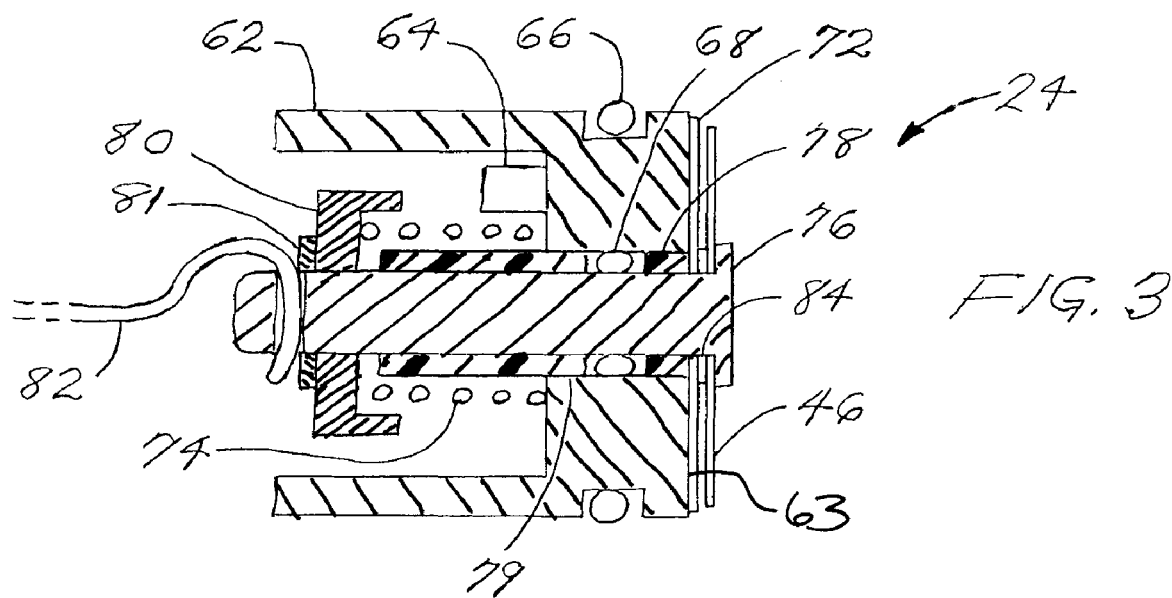
FIG. 3 is a sectional view of a preferred embodiment of a receiving transducer of the present invention.

In order for an acoustic receiving transducer to function well at high frequencies, its movable or flexible plate 46 must have a low mass and a high area-to-mass ratio. Moreover, the movable plate must be closely spaced apart from a fixed plate 63, which is normally a ground plate as used in prior art condenser microphones. A preferred embodiment of such a transducer 24 is depicted in cross-section in FIG. 3. A conductive housing 62 mechanically retains the transducer components and also provides a flat face 63 serving as the capacitive ground plate. An insulator 72 prevents a movable plate 46 from directly contacting the housing 62 and a spacer 84 provides a space for free movement of the movable plate 46. A retainer 76, which may be configured as a headed retaining pin, retains the plate 46, insulator 72 and spacer 84 against the housing 62 and is separated from the housing by two insulators 78, 79. A preferred retainer 76 is biased by a spring 74 against a cap 80 and washer 81, and is restrained by a connecting wire 82 extending through a hole at the end of the retainer distal from the movable plate. As with the acoustic source, O-rings 66, 68 are preferably used to seal the acoustic sensor and prevent leakage of the flowing fluid from the pipe. In addition, an electric heater 64 is preferably attached to the inside of the housing.

The insulator 72, which is depicted as being a free standing member, is not limited to having that form. For example, the insulator 72 may be a thin dielectric coating disposed on either the fixed or the movable plate. Alternately, the movable plate may be formed as a metal film deposited on a dielectric substrate that acts as the insulator. The movable plate, particularly if it is made of very thin material, may also be anchored mechanically on its outer diameter to position it consistently in close proximity to the housing. A protective barrier in the form of a perforated disc (not shown) may be placed in front of the plate if needed.

Figure 3A:
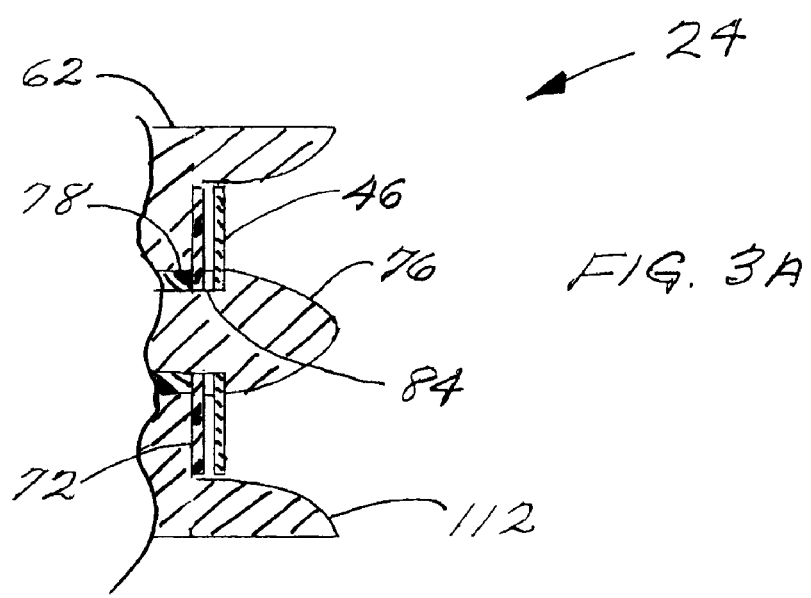
FIG. 3A is a partial sectional view of a preferred embodiment of the present invention depicting an acoustic energy concentrator.

In a particular preferred embodiment depicted in FIG. 3A, the portion of the retainer 76 adjacent the movable plate 46 has a cone-like shape and is used with a concentrator 112 portion of the housing 62 to direct the received acoustic energy onto a smaller diameter movable plate 46. This allows the movable plate to be made thinner and more responsive to higher frequency components of the acoustic pulse. This enables the leading edge of the acoustic pulse to be detected with greater precision.

Although the movable plate 46 is depicted as being a flat sheet, it may incorporate slots or grooves (not shown) to increase its flexibility and further improve its high frequency response. Moreover, the fixed plate 63 portion of the housing 62 may also have depressions or grooves for optimizing the frequency response.

Functional receiving transducers for the intended flow metering application have been produced with housings 0.7 inch long and 0.5 inch in diameter incorporating 0.001 inch thick stainless steel movable plates and 0.001 to 0.003 inch thick polysulfone and polyetheretherketone insulators and spacers. These were generally proportioned in accordance with the depiction of FIG. 3, except that the movable plate, insulator and spacer were relatively much thinner than those depicted. The reader will understand that these distortions were made in the interest of clarity of presentation. The low mass to area relationship of the movable plates is characteristic of condenser transducers. This enables them to respond well to acoustic disturbances in flowing gases.

A heater 64 may be incorporated for those environmental applications subject to a change of state, for example measuring the flow of steam. The heater 64 can be electrically energized to maintain the housing and the other components in a steam environment at a slightly elevated temperature with respect to the fluid itself. This reduces the risk of condensation on transducer components which may detrimentally affect their operation. Although less likely to be needed, the transmitting transducer may also be heated.

In the preferred embodiment, both sides of the movable plate and insulator overlying the fixed plate are exposed to the fluid environment. Hence, it is not necessary to vent the housing to equalize pressure.

The transducer of the present invention is significantly less vulnerable than prior art capacitive transducers to malfunctions associated with condensation and contamination and are therefore the preferred transducers for flow metering applications.

Figure 4A:
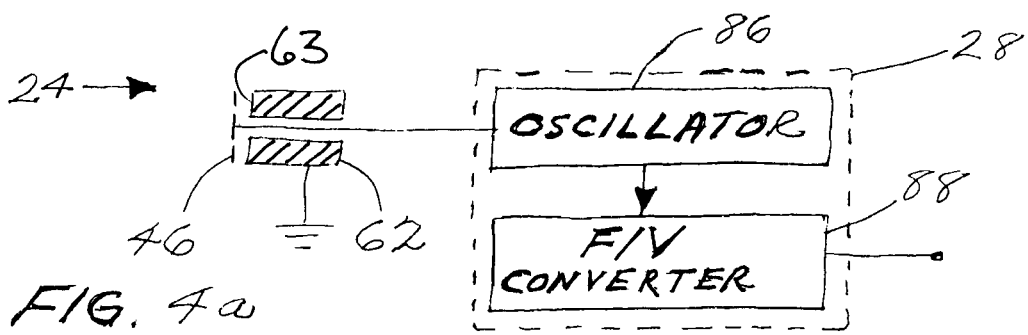
FIG. 4a is a block diagram of the blocks of a preferred embodiment of a receiving transducer and its capacitive detecting circuit.
Figure 4B:
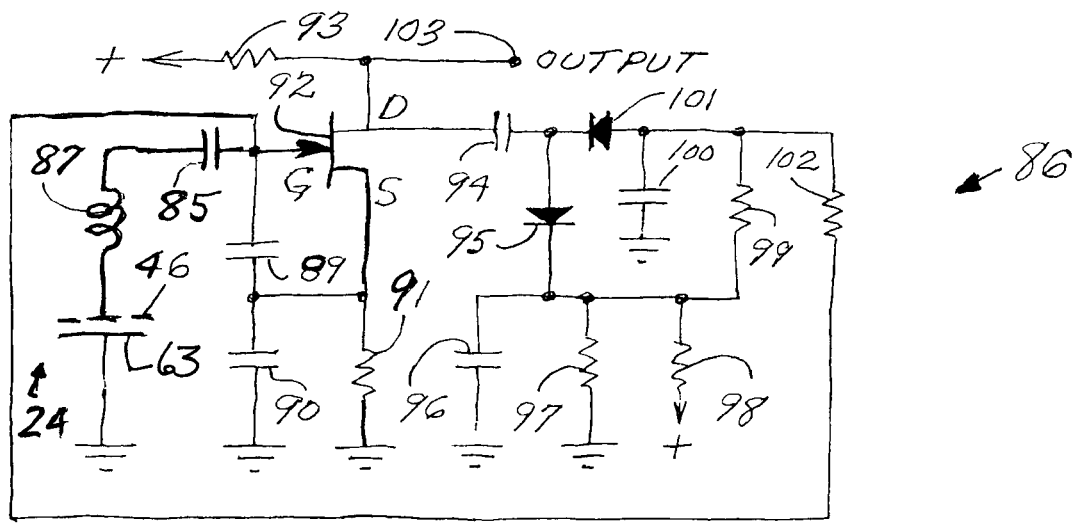
FIG. 4b is a schematic diagram of a receiving transducer and its capacitive detecting circuit.

A block diagram of a preferred embodiment of the capacitance detecting circuit 28 for an acoustic detector or receiving transducer 24 is illustrated in FIG. 4a. An oscillator 86 incorporates the capacitance of the transducer in a tuned circuit controlling its frequency which is then used by the frequency to voltage converter 88 to produce the corresponding voltage. FIG. 4b illustrates a preferred electrical schematic embodiment of the oscillator 86 that is responsive to the transducer capacitance. The transducer housing 62 is grounded and the movable plate 46 is electrically connected to a resonating inductor 87, which is connected in series with a capacitor 85 to the gate of a N-channel junction FET 92. The junction of the series capacitors 89 and 90 connect to the source of the FET along with a resistor 91 to ground. A capacitor 89 terminates at the gate of the FET and a capacitor 90 terminates at ground, thereby providing the positive feedback required for oscillation. The FET drain is the frequency output signal 103. The FET drain is also connected to a resistor 93 which terminates at the plus supply, and to the gain control and bias network that consists of capacitors 94, 96, 100, diodes 95, 101, and resistors 97, 98, 99, 102.

During typical operation of the oscillator circuit, the capacitance between the transducer's movable plate to ground is the dominant capacitance in establishing the resonant frequency with the inductor. The inductor 87 is readily located within the transducer housing and, if it is a leaded device, its wire termination can pass through the hole in the retainer pin 76. The stray shunting capacitance in this arrangement is very small so that very little of the relative change in the transducer capacitance (which effects frequency change from the reception of the acoustic signal) is lost. Capacitive shunting effects on the other terminal of the inductor have relatively little effect on the frequency change. Indeed, considerable shunting is already provided by the feedback capacitors 89, 90. The capacitor 85 is a DC blocking capacitor included to prevent electrical leakage from the fluid or fluid-borne contaminants from affecting the bias voltage. The resistor 91 provides a relatively high impedance DC supply path to the FET source and the resistor 93 serves as its collector load resistor from which the frequency output signal is derived.

The DC component of the output signal is removed by a capacitor 94. The signal is then DC level shifted by a diode 95, biased by the voltage divider consisting of two resistors 97, 98, and stabilized by another capacitor 96. That DC level passes through the diode 101, is stabilized by a capacitor 100, terminated by a resistor 99 to the bias voltage and, through resistor 102, biases the gate of the FET. When the circuit is first powered, the bias voltage supplied to the FET gate moves in a positive direction to increase the FET gain until oscillations begin, at which time the signal rectification by the diodes produces a bias voltage in the negative direction to reduce the FET gain and establish self regulating stable operation.

The oscillator frequencies typically range from a few megahertz to several tens of megahertz depending upon the propagation distances. Lower frequencies are generally used for the greater distances. At the relatively high oscillator frequencies additional gain may be required, suggesting that some circuit refinements may be needed. For example, a peaking coil in series with and providing a moderate reactance with respect to the resistor 93 may be used to increase the FET stage gain and the magnitude of its output signal. Other circuit configurations are also possible, as exemplified in my U.S. Pat. No. 5,392,657 and in Wiley's U.S. Pat. No. 5,381,698 the disclosures of which are incorporated herein by reference.

The oscillator signal frequency is typically converted to a voltage by various means known in the current art. These could include, for example, a phase locked loop and also the low pass filtered output of a pulse generator triggered by the oscillator. Digital means may also be used to identify the rapid frequency change of the oscillator corresponding to reception of the pulsed acoustic signals which can then interface directly with the time difference detector.

Figure 5:
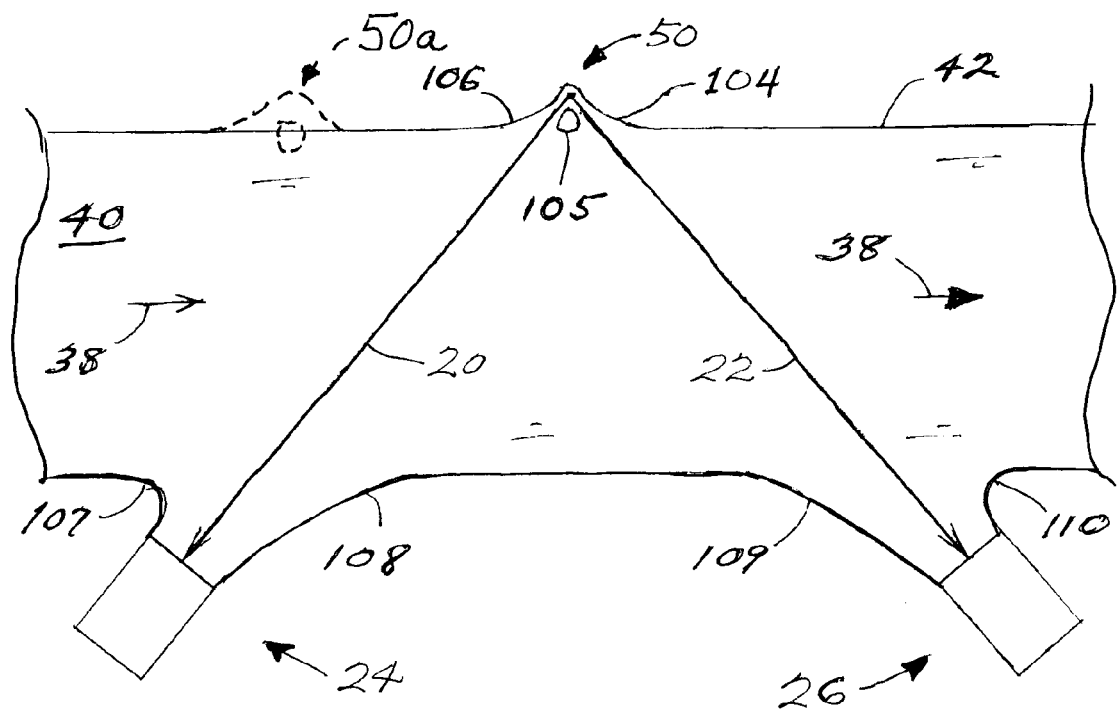
FIG. 5 is a sectional view of a preferred embodiment of the transducers mounted in a pipe.

FIG. 5 is a simplified cross sectional view of an embodiment of the invention comprising transducers mounted in a specially shaped piece of pipe. The source or transmitting transducer 50 is depicted as being located on one side of the pipe 42 so that it is equidistant from the two receiving transducers 24 and 26 mounted on the other side of the pipe. The acoustic power travels from the source to the receivers along paths shown by arrows 20, 22 respectively. The fluid 40 is indicated as flowing along the axis of the pipe by arrows 38. When the spark gap is immersed in the flowing fluid the spark is shifted in position by the flow, which can provide an increase in the detected transit time difference. This effect may be further modified by shaped parts 104, 105, 106 that concentrate the acoustic energy in both the upstream and downstream direction so as to maximize acoustic power delivered to the receiving transducers.

In applications experiencing very high fluid flow rates, such as in high velocity steam flow, the propagation paths of the acoustic beams 20,22 will shift along the flow direction enough that the beams will not be well centered on their intended targets. This can lead to a significant reduction in the received acoustic signal levels. To compensate for this the transmitting transducer 50 can be shifted upstream to a position depicted in phantom as 50a in FIG. 5. If the range of fluid flow rates is very great, or if flow rate measurement in both directions is desired, more than one transmitting transducer 50, 50a may be installed spaced along the flow direction to define overlapping flow measurement ranges. In this case one can selectively (e.g., sequentially) operate different sources and then select the source transducer to be used based on received signal strength.

Figure 2:
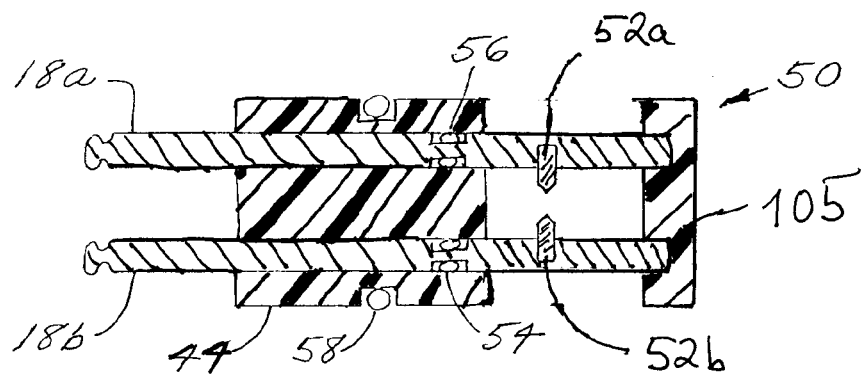
FIG. 2 is a sectional view of a preferred embodiment of the transmitting transducer of the present invention.

In the depiction of FIG. 5 the pipe interior is shaped to maximize the acoustic signal transfer between the transmitting and receiving transducers and includes both horn-like portions 104, 106 of the pipe adjacent the transmitting transducer electrodes and another shaped portion 105 that may be a separately supported rod-like element extending parallel to the spark gap defined between the electrodes 18a, 18b or that may be a supported by the electrodes, as depicted in FIG. 2. Other shaped portions 107, 108, 109, 110 are preferably supplied adjacent the receiving transducers 24, 26. The various shaped portions may be separate parts of each of the transducer mountings, may be pre-assembled sections of pipe having built-in transducers, or may be separate pieces that are individually attached to the interior of the pipe by means providing a smooth junction that does not introduce swirl or other flow artifacts. These curved shapes could, for example, take on the flare of a musical horn if the flowing fluid were a gas, and are selected to enhance transmission of the acoustic pulse along the beam paths 20, 22. The smooth surfaces of the shaped portions 104-110 reduce turbulence and the acoustic noise associated with it. This improves the transducer directivity so that reduced transmitting power and/or receiving amplification is required to achieve the desired immunity from background noise. In addition, preferred embodiments of the shaped flow meter configuration ensure that the active transducer regions are recessed from the direct fluid flow and are thereby protected from being directly contacted by potentially high speed flow-borne objects.

Figure 6:
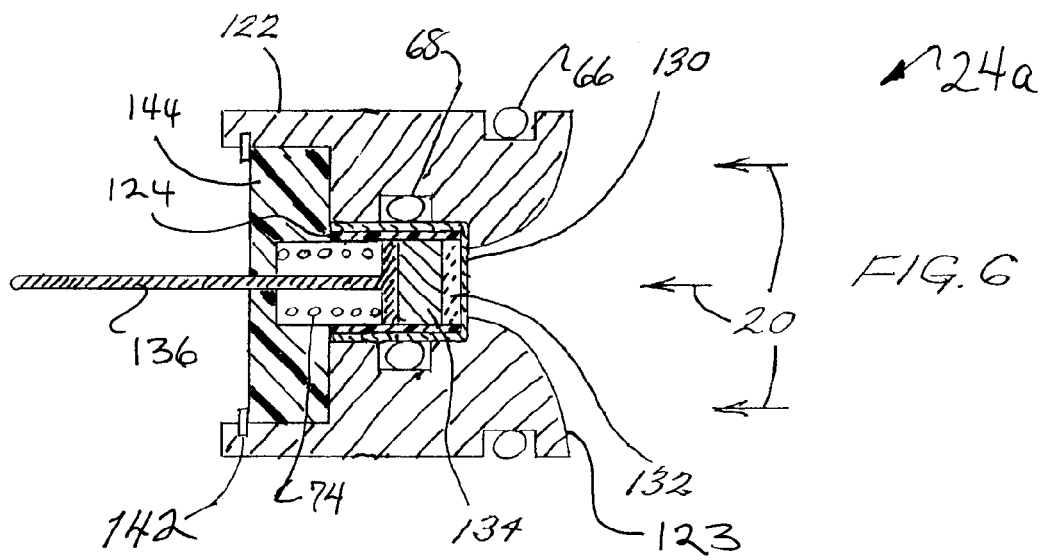
FIG. 6 is a sectional view of a preferred embodiment of a receiving transducer of the present invention using a piezoelectric transducer element.

Turning now to FIG. 6, one finds a partial sectional view of an embodiment of a receiving transducer 24a using a ceramic piezoelectric transducer element. This may be suitable for applications at lower operating temperatures than is the capacitor type transducer depicted in FIG. 3. For example, if conventional lead zirconate titanate (PZT) elements are used, an upper limit for operating temperature is expected to be between one hundred and one hundred fifty degrees Celsius. Some other higher temperature, higher cost piezoelectric elements with reduced sensitivities are available.

In a preferred piezoelectric transducer a conductive housing 122 contains the transducer components and is fitted with an O-ring 66 for a fluid seal between the transducer 24a and the pipe 42. The acoustic input side 123 of the housing is shaped to concentrate the acoustic beam 20 onto an acoustic window 130 that is preferably formed as a metallic cylinder having a closed end. The window 130 is in abutting contact with both the housing 122 and a piezoelectric element 132 which is typically in the shape of a disc with conductive flat surfaces on both sides. Thus, the window 130 serves to transfer the acoustic energy to the piezoelectric element 132 and to electrically connect the input side of the piezoelectric element to the housing 122, which is the nominal ground connection. The cylindrical sleeve portion of the window 130 is preferably sealed to the housing by an O-ring 68 and is electrically insulated from the remainder of the piezoelectric element 132 by means of an insulating sleeve 124. The side of the piezoelectric element 132 distal from the window 130 is preferably in electrical contact with a conductive spacer 134 which may be selected to have appropriate isolation or resonant properties to optimize the acoustic response of the element 132. The spacer 134 is in abutting electrical contact with an electrode 136 which provides the electrical output signal from the piezoelectric element. The combination of an electrically insulating backplate 144, which may be held in place by a retaining ring 142, and a bias spring 74 is preferably used to clamp the component stack comprising the electrode 136, the spacer 134 and the piezoelectric element 132 against the window 130. This provides the electrical and acoustic connections between the adjacent elements and resists the flow environment pressures which would tend to displace the stack. A small amount of acoustic coupling material (not shown), such as a silicone grease, may be used between the piezoelectric element and window to enhance acoustic energy transfer between the two.

By employing the relatively high acoustic power levels from the spark source 50, and by focusing a significant fraction of that power onto a piezoelectric element, sufficient received signal magnitude can become available for a transit-time measurement of a flowing gas. As with the capacitive receiving transducers discussed previously, output signals from two piezoelectric receiving transducers can be amplified and input to a time difference detector in order to measure flow.

In the various views of the drawings, the source transducer is depicted as directly communicating with the receiving transducers. The reader will appreciate, however, that one could also select acoustic paths in which the acoustic signals are reflected from the pipe or from a reflecting body installed with the transducers. All of the transducers may then be mounted on the same side of the pipe.

Although the present invention has been described with respect to several preferred embodiments, many modifications and alterations can be made without departing from the invention. Accordingly, it is intended that all such alterations be considered as within the spirit and scope of the invention as defined in the attached claims.

The invention claimed is:

1. A time of flight flow meter for measuring flow of a fluid along a flow direction, the meter comprising:
   at least one acoustic source comprising two electrodes separated by a gap through which the fluid flows when the meter is in use, the at least one source operable responsive to a high voltage input to supply an acoustic pulse;
   two capacitive acoustic detectors spaced apart along the flow direction, each of the acoustic detectors comprising:
   a respective fixed plate exposed to the fluid and facing the acoustic source; and
   a respective movable plate interposed between the respective fixed plate and the acoustic source, each movable plate spaced apart from the associated respective fixed plate by means of a respective insulator interposed therebetween, each movable plate having a respective front surface and a respective rear surface, each rear surface facing the respective fixed plate and each front surface facing the acoustic source, both the front and the rear surfaces of the respective movable plate exposed to the fluid; and
   a circuit operable to selectively detect respective changes in electrical capacitance occurring when the acoustic pulse arrives at each of the acoustic detectors; to determine a time of flight difference between the respective changes, and to calculate therefrom the rate of flow of the fluid.

2. The flow meter of claim 1 wherein each of the acoustic detectors further comprises a respective electric heating element.

3. The flow meter of claim 1 wherein each of the acoustic detectors further comprises a respective clamping pin having a conical head extending from the front surface of the respective movable plate toward the acoustic source, the respective clamping pin extending rearwardly through a central throughhole in the respective movable plate so as to capture the respective movable plate between the respective conical head and the respective fixed plate.

4. The flow meter of claim 1 wherein each of the acoustic detectors further comprises a respective bias spring acting to bias a respective clamping pin away from the acoustic source, the respective clamping pin extending through a central throughhole in the respective movable plate so as to capture the respective movable plate between a respective head of the respective clamping pin and the respective fixed plate.

5. The flow meter of claim 1 wherein each of the acoustic detectors comprises a respective metallic housing having the respective fixed plate as a portion thereof.

6. The flow meter of claim 1 wherein the respective movable plate of at least one of the detectors comprises a respective insulating substrate having a metal film deposited thereon.

7. The flow meter of claim 1 wherein the respective fixed plate of at least one of the detectors has a selected diameter and wherein the associated movable plate has a diameter no more than the selected diameter.

8. The flow meter of claim 1 wherein each capacitive detector comprises a respective housing having a respective acoustic concentrator portion surrounding the respective movable plate and extending therefrom toward the acoustic source.

9. The flow meter of claim 1 further comprising an acoustic concentrator associated with the at least one acoustic source.

10. The flow meter of claim 1 comprising two acoustic sources spaced apart along the flow direction, each source selectively operable to supply the acoustic pulse.

11. A time of flight flow meter for measuring flow of a fluid along a flow direction within a pipe, the meter comprising:
at least one acoustic source comprising two electrodes separated by a gap through which the fluid flows when the meter is in use, the at least one source operable responsive to a high voltage input to supply an acoustic pulse, the at least one source disposed adjacent an interior portion of the pipe shaped to direct the acoustic pulse along two beams extending across the pipe;
two acoustic detectors spaced apart along the flow direction, each of the detectors intersecting a respective one of the beams, each of the detectors having associated therewith a smoothly shaped surface for concentrating the acoustic pulse onto the respective detector; and
a circuit operable to selectively detect respective signals responsive to the acoustic pulse arriving at each of the acoustic detectors; to determine a time of flight difference between the respective changes, and to calculate therefrom the rate of flow of the fluid.

12. The flow meter of claim 11 wherein the portion of the pipe shaped to direct the acoustic pulse comprises horn-like portions of the pipe extending both upstream and downstream from the at least one source.

13. The flow meter of claim 11 wherein the at least one source comprises a rod extending parallel to the gap between the two electrodes.

14. The flow meter of claim 11 comprising two acoustic sources spaced apart along the flow direction, each source selectively operable to supply the acoustic pulse.

15. The flow meter of claim 11 wherein each of the smoothly shaped surfaces for concentrating the acoustic pulse onto the respective detector comprises a portion of a respective housing thereof.

16. The flow meter of claim 11 wherein each of the smoothly shaped surfaces for concentrating the acoustic pulse onto the respective detector comprises a horn-like portion of the pipe.

17. The flow meter of claim 11 wherein each of the acoustic detectors is a respective capacitive detector comprising a respective fixed plate exposed to the fluid and facing the acoustic source and a respective movable plate interposed between the respective fixed plate and the acoustic source, each movable plate spaced apart from the associated respective fixed plate by means of a respective insulator interposed therebetween, each movable plate having a respective front surface and a respective rear surface, each rear surface facing the associated respective fixed plate and each front surface facing the acoustic source, both of the front and both of the rear surfaces of the movable plates exposed to the fluid.

18. The flow meter of claim 11 wherein each of the acoustic detectors is a respective piezoelectric receiving transducer comprising a respective housing having a respective input side shaped to concentrate the respective acoustic beam onto a respective acoustic window coupled to a respective piezoelectric ceramic element.

* * * * *